US008787617B2

(12) United States Patent
Nishino

(10) Patent No.: US 8,787,617 B2
(45) Date of Patent: Jul. 22, 2014

(54) IMAGING APPARATUS, MOBILE BODY DETECTING METHOD, MOBILE BODY DETECTING CIRCUIT AND PROGRAM

(75) Inventor: Katsuaki Nishino, Kanagawa (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 12/716,559

(22) Filed: Mar. 3, 2010

(65) Prior Publication Data

US 2010/0232648 A1 Sep. 16, 2010

(30) Foreign Application Priority Data

Mar. 11, 2009 (JP) ................................. P2009-058357

(51) Int. Cl.
*G06K 9/00* (2006.01)
*H04N 7/00* (2011.01)

(52) U.S. Cl.
USPC ........................... 382/103; 382/107; 348/143

(58) Field of Classification Search
CPC ... A61B 5/7203; G06K 9/00771; G06K 9/38; G06K 9/00664; G06K 9/00711; G06K 2209/23; G06K 9/00362; G06K 9/00785; G06K 9/00147; G06K 9/00228; G06K 9/00201; G06K 9/0063; G06K 9/00778; G06T 2207/10016; G06T 2207/20144; G06T 2207/30232; G06T 7/20; G06T 7/0042; G06T 7/2013; G06F 17/3079; G08B 13/19606; G08B 13/1961; G08B 13/19613; G08B 13/19604; H04N 19/00266; H04N 19/00587
See application file for complete search history.

(56) References Cited

U.S. PATENT DOCUMENTS

| 6,906,620 | B2 * | 6/2005 | Nakai et al. ................... 340/435 |
| 6,985,172 | B1 * | 1/2006 | Rigney et al. ................ 348/149 |
| 7,132,933 | B2 * | 11/2006 | Nakai et al. ................... 340/435 |
| 7,336,803 | B2 * | 2/2008 | Mittal et al. .................. 382/103 |
| 7,366,323 | B1 * | 4/2008 | Yao et al. ...................... 382/103 |
| 7,391,907 | B1 * | 6/2008 | Venetianer et al. ........... 382/224 |
| 7,460,691 | B2 * | 12/2008 | Ng et al. ....................... 382/107 |
| 7,574,019 | B2 * | 8/2009 | Mittal et al. .................. 382/103 |
| 7,620,266 | B2 * | 11/2009 | Brown et al. ................. 382/278 |
| 7,742,650 | B2 * | 6/2010 | Xu et al. ....................... 382/257 |
| 7,826,640 | B1 * | 11/2010 | Yao et al. ...................... 382/103 |
| 8,189,049 | B2 * | 5/2012 | Lopota et al. ................ 348/152 |
| 8,379,928 | B2 * | 2/2013 | Kuoch et al. ................. 382/104 |
| 8,571,261 | B2 * | 10/2013 | Gagvani et al. .............. 382/103 |
| 2005/0036658 | A1 * | 2/2005 | Gibbins et al. ............... 382/103 |
| 2005/0180603 | A1 * | 8/2005 | Zoghlami et al. ............ 382/103 |

(Continued)

FOREIGN PATENT DOCUMENTS

| JP | 11 41589 | 2/1999 |
| JP | 2001 8189 | 1/2001 |
| JP | 2003-162724 | 6/2003 |
| JP | 2007-272733 | 10/2007 |

*Primary Examiner* — Manav Seth
(74) *Attorney, Agent, or Firm* — Frommer Lawrence & Haug LLP; William S. Frommer; Ellen Marcie Emas

(57) ABSTRACT

An imaging apparatus includes: a moving body detecting section that detects if an object in an image is a moving body which makes a motion between frames; and an attribute determining section that determines a similarity indicating whether or not the object detected as the moving body is similar among a plurality of frames, and a change in luminance of the object based on a texture and luminance of the object, and, when determining that the object is a light/shadow-originated change in luminance, adds attribute information indicating the light/shadow-originated change in luminance to the object detected as the moving body.

10 Claims, 7 Drawing Sheets

EXAMPLE OF STATIC AREA AND DYNAMIC AREA IN MOVEMENT OF MOVING BODY

FIRST EXAMPLE WHEN PERSON (MOVING BODY) MOVES FRONTWARD FROM DEEPER SIDE OF SCREEN TOWARD

SECOND EXAMPLE WHEN PERSON (MOVING BODY) MOVES FRONTWARD FROM DEEPER SIDE OF SCREEN TOWARD

(56) References Cited

U.S. PATENT DOCUMENTS

| | | |
|---|---|---|
| 2006/0170769 A1* | 8/2006 | Zhou .............................. 348/143 |
| 2006/0274917 A1* | 12/2006 | Ng et al. ....................... 382/103 |
| 2009/0060277 A1* | 3/2009 | Zhang et al. .................. 382/103 |
| 2009/0060352 A1* | 3/2009 | Distante et al. ............... 382/224 |
| 2009/0067716 A1* | 3/2009 | Brown et al. ................. 382/173 |
| 2010/0290710 A1* | 11/2010 | Gagvani et al. ............... 382/224 |
| 2010/0316257 A1* | 12/2010 | Xu et al. ....................... 382/103 |

* cited by examiner

EXAMPLE OF INTERNAL CONFIGURATION OF IMAGING APPARATUS

EXAMPLE OF INTERNAL CONFIGURATION OF IMAGE PROCESSING SECTION

EXAMPLE OF GROUP USED IN LABELING

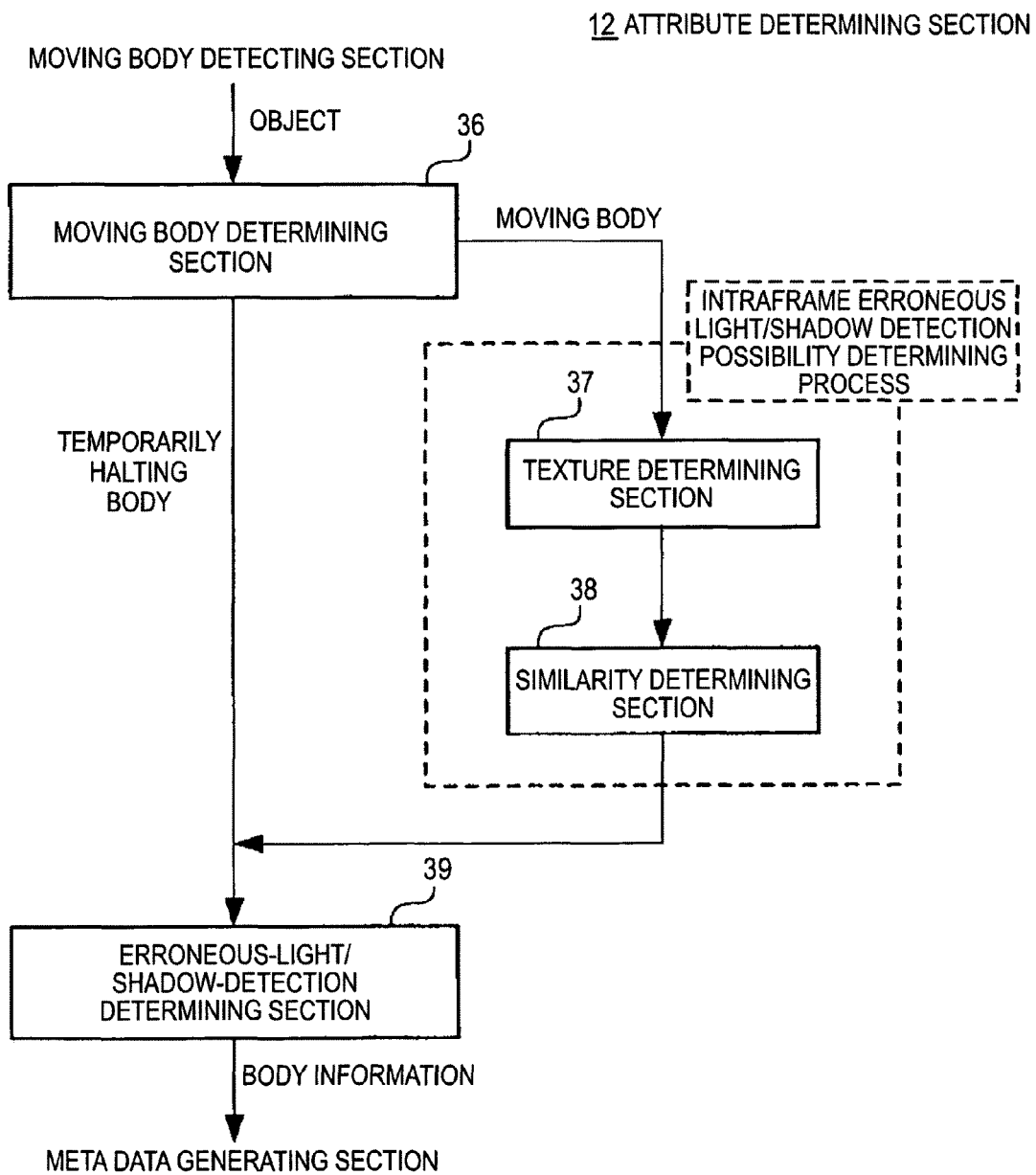

EXAMPLE OF SIMILARITY OF OBJECT ORIGINATED FROM TEXTURE DIFFERENCE

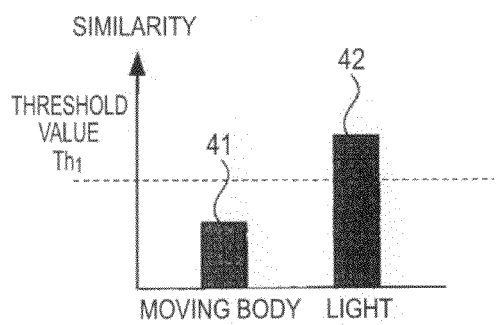

FIG.6A

EXAMPLE OF SIMILARITY FOR OBJECT WITH LARGE TEXTURE

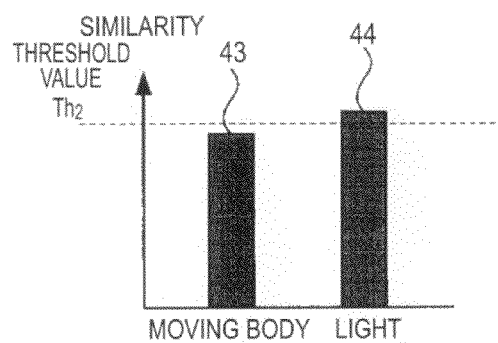

FIG.6B

EXAMPLE OF SIMILARITY FOR OBJECT WITH SMALL TEXTURE

EXAMPLE OF SIMILARITY OF TEXTURE BETWEEN PRESENT IMAGE AND PAST IMAGE

FIG.7A

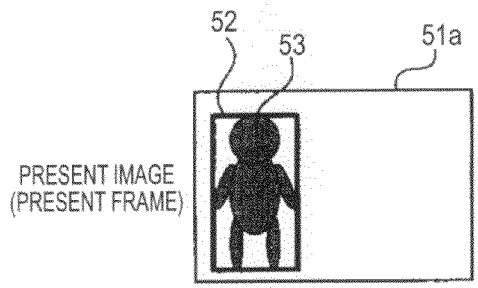

PRESENT IMAGE (PRESENT FRAME)

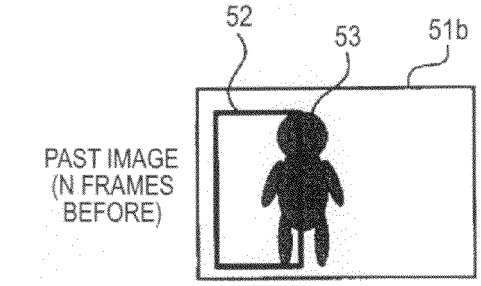

PAST IMAGE (N FRAMES BEFORE)

EXAMPLE OF SIMILARITY OF TEXTURE WHEN OBJECT IS PERSON (MOVING BODY)

FIG.7B

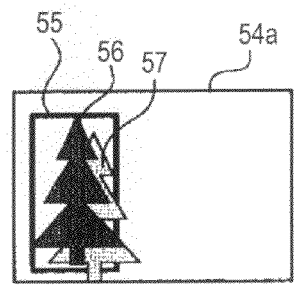

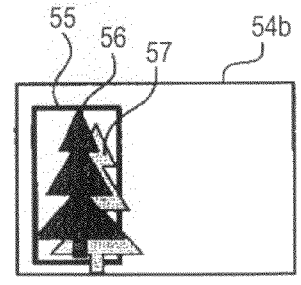

EXAMPLE OF SIMILARITY OF TEXTURE WHEN OBJECT IS STATIC BODY

EXAMPLE OF STATIC AREA AND DYNAMIC AREA IN MOVEMENT OF MOVING BODY

*FIG.8A*

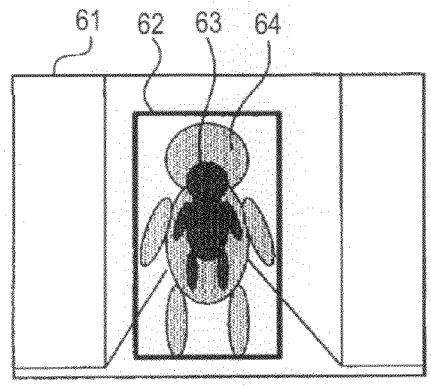

FIRST EXAMPLE WHEN PERSON (MOVING BODY) MOVES FRONTWARD FROM DEEPER SIDE OF SCREEN TOWARD

*FIG.8B*

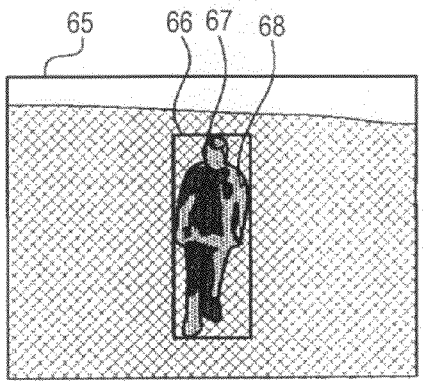

SECOND EXAMPLE WHEN PERSON (MOVING BODY) MOVES FRONTWARD FROM DEEPER SIDE OF SCREEN TOWARD

COMPARATIVE EXAMPLE OF NORMAL SIMILARITY AND SIMILARITY OF STATIC AREA

*FIG.9A*

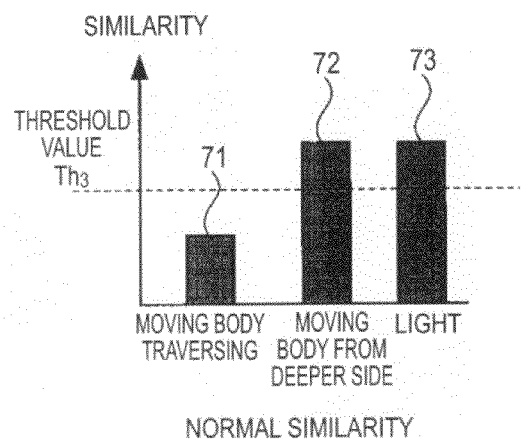

NORMAL SIMILARITY

*FIG.9B*

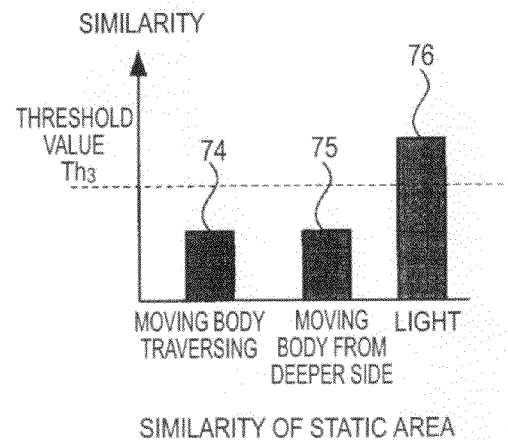

SIMILARITY OF STATIC AREA

EXAMPLE OF RESULT OF DETECTION USING PAST
MOVING BODY DETECTING PROCESS

Related Art

EXAMPLE OF RESULT OF DETECTION USING MOVING BODY
DETECTING PROCESS ACCORDING TO THE INVENTION

IMAGING APPARATUS, MOBILE BODY DETECTING METHOD, MOBILE BODY DETECTING CIRCUIT AND PROGRAM

BACKGROUND OF THE INVENTION

1. Field of the Invention

The present invention relates to an imaging apparatus, a moving body detecting method, a moving body detecting circuit, and a program which are suitably adapted to, for example, a case of detecting a moving body.

2. Description of the Related Art

There is an imaging apparatus for a monitoring purpose, which can image a subject with visible light or infrared light. An image picked up by the imaging apparatus shows various things which are individually specified by a process for a computer device to identify them as objects. The computer device adds various kinds of information to an object to facilitate subsequent image processing.

There is also a monitor system which enhances the security performance by specifying an intruder from an image picked up by a monitoring imaging apparatus. Such a monitor system detects an intruder by detecting a moving object as a moving body with respect to the background contained in the image. This allows the monitor system to catch and detect an intruder whose slight motion may be overlooked merely by human visual monitoring, and the motion of an intruder whose density matches with that of the background.

In the foregoing description, "moving body" includes a body which moves (e.g., the overlaid portion of an object changes by 10% or more every frame (1/15 second)) or a body which moves after temporary halting.

JP-A-2001-8189 (Patent Document 1) discloses an art of detecting a moving object by tracking an object candidate obtained from a change in luminance acquired from the difference between a directly previous image and an original image.

JP-A-11-41589 (Patent Document 2) discloses an art of performing density pattern matching on a change area extracted from the difference between images between two frames, regarding the change area as a disturbance when a similarity therebetween is higher than a predetermined value, and detecting the change area whose similarity is low as a moving object.

SUMMARY OF THE INVENTION

However, even the use of the art of executing normalized correlation to remove a light influence as a disturbance as described in Patent Document 1 cannot detect an object which moves frontward from a deeper side of an image, as a moving body. This is because when an object moves frontward from a deeper side, the coordinates in an image hardly change, so that the object does not look moving. When an object temporarily halts, temporary halting is determined merely based on the position of the object in the image. This may cause the monitor system to erroneously detect that the object is a part of the background even though the temporarily halted object is a moving body, resulting in a poor moving body detecting accuracy.

In addition, even the use of the art of determining a light influence by computing normalized correlation as described in Patent Document 2 cannot detect a person who moves frontward from a deeper side of an image, or a person who temporarily halts, as a moving body.

In consideration of the foregoing situations, it is desirable to enhance the moving body detecting accuracy.

According to an embodiment of the present invention, first, it is detected if an object in an image is a moving body which makes a motion between frames.

Next, a similarity indicating whether or not the object detected as the moving body is similar among a plurality of frames, and a change in luminance of the object are determined based on a texture and luminance of the object.

Then, when it is determined that the object has a light/shadow-originated change in luminance, attribute information indicating the light/shadow-originated change in luminance is added to the object detected as the moving body.

Accordingly, it is possible to determine whether or not an object whose luminance is changed is a moving body.

According to the embodiment of the invention, it is determined whether or not an object detected as a moving body is resulted from a change in luminance thereof. Accordingly, based on a change in luminance of an object which moves frontward from a deeper side of a frame, or an object which temporarily halts, the object can be detected as a moving body. Further, adding attribute information indicating a light/shadow-originated change in luminance to an object brings about an effect of enhancing the moving body detecting accuracy.

BRIEF DESCRIPTION OF THE DRAWINGS

FIG. 5 is a block diagram showing an example of the internal configuration of an attribute determining section according to the embodiment of the invention;

FIGS. 6A and 6B are explanatory diagrams showing examples of the similarity of an object based on a difference in texture according to the embodiment of the invention;

FIGS. 7A and 7B are explanatory diagrams showing examples of the similarity in texture between a present image and a past image according to the embodiment of the invention;

FIGS. 8A and 8B are explanatory diagrams showing examples of a static area and a dynamic area in the motion of a moving body according to the embodiment of the invention;

FIGS. 9A and 9B are explanatory diagrams showing comparative examples of the normal similarity and the similarity of a static area according to the embodiment of the invention.

DETAILED DESCRIPTION OF THE PREFERRED EMBODIMENT

A best mode for carrying out the present invention (hereinafter referred to as "embodiment") will be described below.

The description will be given in the following order.
1. One Embodiment (moving body detection control: example of a process of detecting a moving body)
2. Modifications

1. One Embodiment

Example of the Internal Configuration of an Imaging Apparatus

One embodiment of the invention will be described with reference to the accompanying drawings. The description of the embodiment will be given of an example where the embodiment is adapted to an imaging apparatus 1 which detects a moving body from objects in an image picked up.

Figure 1:
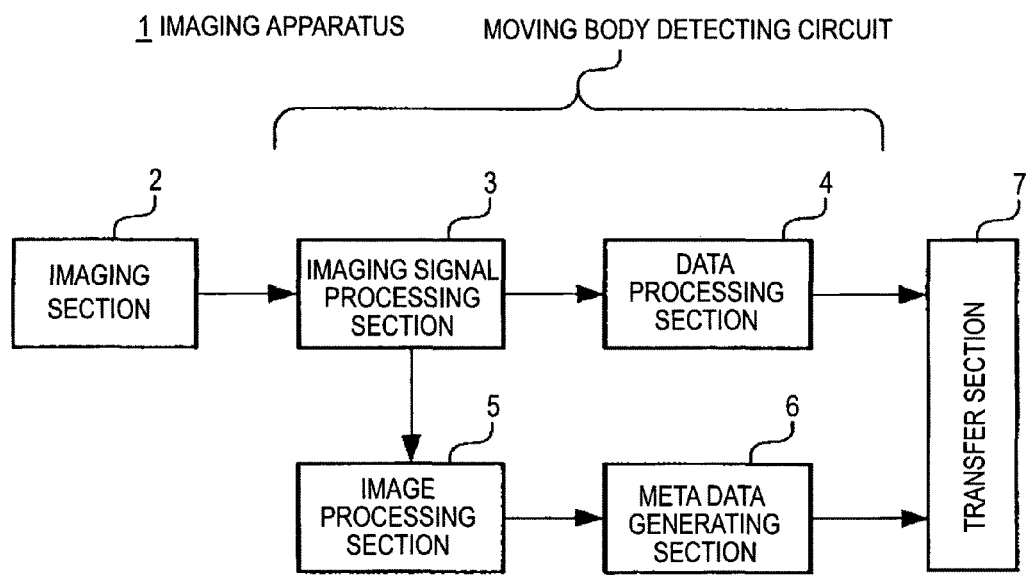
FIG. 1 is a block diagram showing an example of the internal configuration of an imaging apparatus according to an embodiment of the present invention.

FIG. 1 is a block diagram showing an example of the internal configuration of the imaging apparatus 1.

The imaging apparatus 1 includes an imaging section 2 that generates an imaging signal from image light acquired via an optical system, such as a lens and a shutter, and an imaging signal processing section 3 that performs a predetermined process on the imaging signal. The imaging section 2 has, for example, a CCD (Charge Coupled Devices) imager or a CMOS (Complementary Metal Oxide Semiconductor) sensor as an imaging element that generates an imaging signal.

The imaging apparatus 1 further includes a data processing section 4 that performs a predetermined process on the imaging signal subjected to the predetermined process by the imaging signal processing section 3, and an image processing section 5 that analyzes an image acquired from the imaging signal and outputs attribute information unique to an object in the image. An example of the detailed internal configuration of the image processing section 5 will be described later.

The imaging apparatus 1 also includes a meta data generating section 6 that generates meta data from image data subjected to predetermined image processing by the image processing section 5. The meta data includes basic information on an image, such as a flag to be set to specify if an object is a light/shadow and a shooting time. The imaging apparatus 1 also includes a transfer section 7 that transfers processed data received from the data processing section 4 and meta data received from the meta data generating section 6 to an unillustrated receiving apparatus. The imaging signal processing section 3, the data processing section 4, the image processing section 5 and the meta data generating section 6 are used as a moving body detecting circuit for detecting if an object is a moving body.

Detection of an object as a moving body is hereinafter called "moving body detection". Further, detection of light or a shadow put in an image by a street light, room light or the like is hereinafter called "light/shadow detection". In addition, erroneous detection of light/shadow even though an object is a moving body is hereinafter called "erroneous light/shadow detection".

The meta data generating section 6 processes attribute information and an object received from the image processing section 5, and generates meta data containing basic information of an image based on the object to which the attribute information indicating that the object has a light/shadow-originated change in luminance, and basic information of the image based on the object to which the attribute information indicating that the object is a light/shadow-originated change in luminance is added. Then, the meta data generating section 6 outputs the generated meta data to the transfer section 7. It is to be noted however that when the image processing section 5 (attribute determining section 12 to be described later) has added attribute information indicating that light/shadow detection has been done to the object, the meta data generating section 6 may select an option of not transferring meta data to the transfer section 7.

The transfer section 7 transfers meta data of an image, which is generated by the meta data generating section 6, and an image file generated by the data processing section 4. The unillustrated receiving apparatus that receives data from the imaging apparatus 1 can select a predetermined process based on the received object and attribute information. For example, the receiving apparatus can select a process of generating an alarm notifying that light/shadow detection has been done, a process of not generating an alarm in case of erroneous light/shadow detection, or the like.

Figure 2:
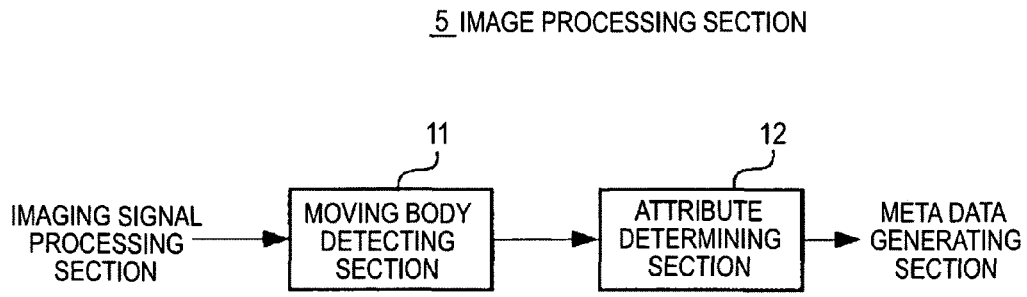
FIG. 2 is a block diagram showing an example of the internal configuration of an image processing section according to the embodiment of the invention.

FIG. 2 shows an example of the internal configuration of the image processing section 5.

The image processing section 5 has a moving body detecting section 11 that specifies an object from an image acquired by an imaging signal input from the imaging signal processing section 3, and detects if the object is a moving body which makes a motion between frames. The image processing section 5 also has an attribute determining section 12 that determines whether or not light/shadow detection of an object detected as a moving body has been done, and adds attribute information to the object.

The moving body detecting section 11 detects an object which makes a motion among a plurality of frames as a moving body. However, the moving body detecting section 11 may detect an object as a moving body even if the object is moved by a change in light/shadow.

Processes by which the moving body detecting section 11 detects a moving body include a process of using only a time difference (interframe difference), a process of using a background difference, a process of using both a time difference and a background difference, and a process of using other information (e.g., computing motion information from an image to detect a moving body). The moving body detecting section 11 according to the embodiment determines whether or not light/shadow detection has been done using both the time difference and background difference.

The attribute determining section 12 determines a similarity indicating whether or not an object detected as the moving body is similar among a plurality of frames, and a change in luminance of the object based on the texture and luminance of the object. When determining that the object is a light/shadow-originated change in luminance, the attribute determining section 12 adds attribute information indicating the light/shadow-originated change in luminance to the object detected as a moving body. Then, the attribute determining section 12 supplies the object determined as a light/shadow-originated change in luminance and attribute information indicating light/shadow detection to the meta data generating section 6 for each object.

Figure 3:
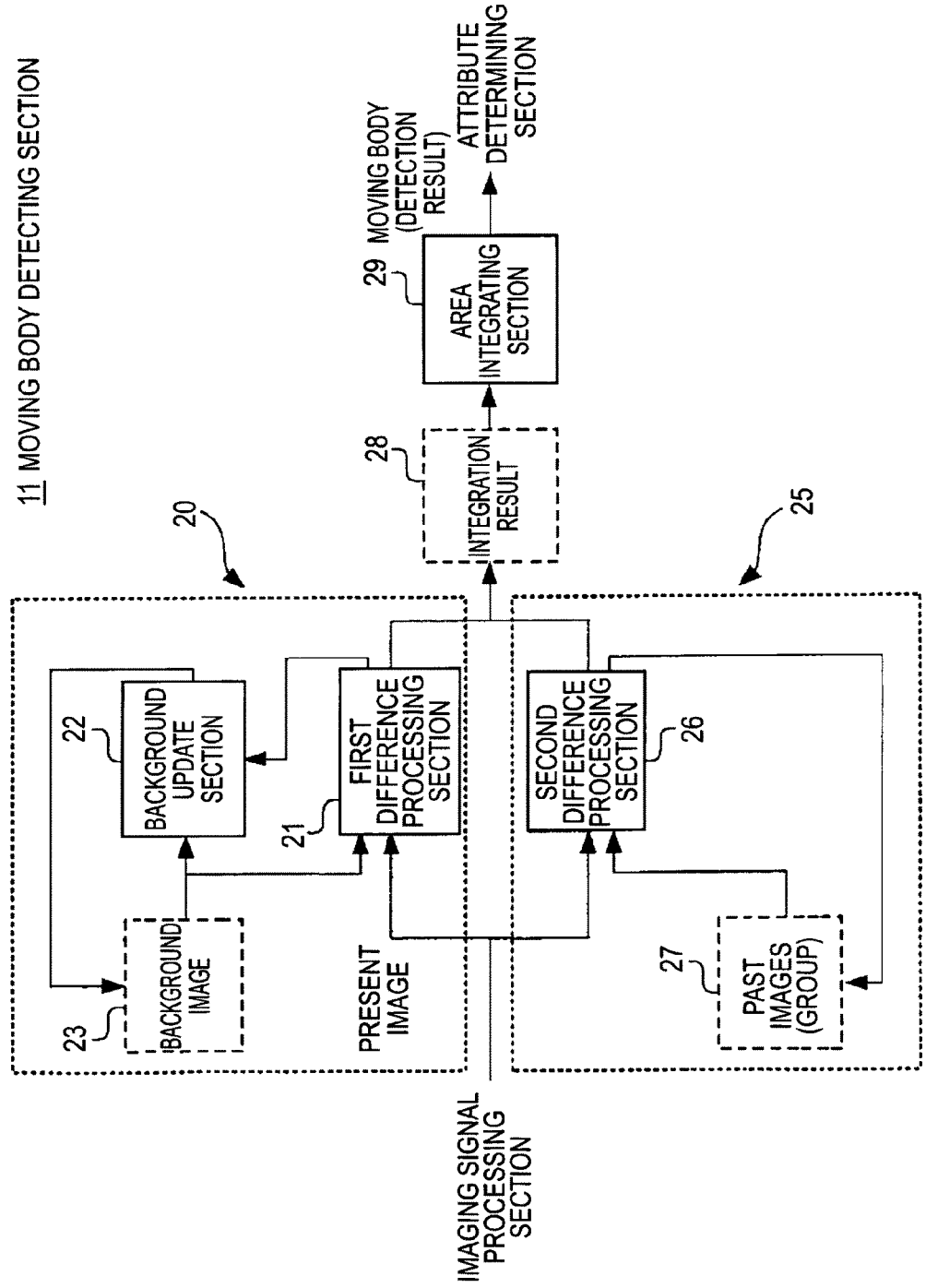
FIG. 3 is a block diagram showing an example of the internal configuration of a moving body detecting section according to the embodiment of the invention.

FIG. 3 shows an example of the internal configuration of the moving body detecting section 11.

The moving body detecting section 11 has a background difference processing section 20 that processes a difference in background images acquired from images among a plurality of frames to output background difference data, and a time difference processing section 25 that processes a time difference in the images to output time difference data. The moving body detecting section 11 further has an area integrating section 29 that performs an area integration process to detect an object in an image based on an integration result 28 representing the integration of the background difference data and the time difference data.

An image acquired from a present frame to be processed is hereinafter called "present image". Further, an image which is supplied before the present frame and stored in an unillustrated storage section therebefore, and is read out from the storage section to be compared with the present image is hereinafter called "past image". Furthermore, an image which is created by acquiring only an object which is substantially still over a plurality of consecutive frames through computation is hereinafter called "background image".

The background difference processing section 20 has a first difference processing section 21 that acquires a difference in the background previous by one frame from the background of the present image supplied from the imaging signal processing section 3, and a background update section 22 that creates a background image 23 which is the acquired background difference subtracted from the background of the present image. The background image 23 updated by the background update section 22 is stored in the unillustrated storage section. Then, the background image 23 read from the storage section is input to the first difference processing section 21 and the background update section 22 to be processed therein.

The time difference processing section 25 has a second difference processing section 26 that acquires a time difference between the present image supplied from the imaging signal processing section 3 and a past image 27 stored in the unillustrated storage section. The present image processed by the second difference processing section 26 is stored in the unillustrated storage section as a group of past images 27. Then, the past image 27 read from the storage section is input to the second difference processing section 26 to be processed therein.

Next, an example of the moving body detecting process will be described.

The background difference processing section 20 checks those of individual pixels at which a luminance difference between the present image and the background image is greater than a predetermined threshold value, and detects a collection of pixels to be finally coupled together (pixels adjoining to one another) as a moving body.

The time difference processing section 25 checks any one of the individual pixels at which a luminance difference between the present image and the group of past images 27 is greater than a predetermined threshold value.

At the time of determining whether or not the luminance difference at each pixel included in the input image is greater than a threshold value, the moving body detecting section 11 uses the background difference acquired by the background difference processing section 20 and the time difference acquired by the time difference processing section 25. This can ensure stable detection of a moving body even if a disturbance, such as a swinging object (e.g., tree leaves) is shown in the image.

The information on the background difference output from the first difference processing section 21 and the information on the time difference output from the second difference processing section 26 are combined to generate an integration result 28. Then, the integration result 28 is input to the area integrating section 29 to define a rectangular frame circumscribing a group for each label.

An example of the area integration process that is carried out by the area integrating section 29 will be described below referring to FIGS. 4A to 4C. The area integration process generally employs an image processing scheme called "labeling".

Figures 4A, 4B, 4C:
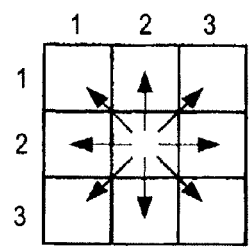
FIGS. 4A to 4C are explanatory diagrams showing an example of an area integrating process which is executed by the moving body detecting section according to the embodiment of the invention.

FIG. 4A shows an example of a group which is used in the labeling process.

"Labeling" is a process which assigns the same label (e.g., numerical value) to neighborhood pixels to be coupled to a pixel of interest to classify a plurality of areas into an independent group. In this embodiment, labeling is performed on areas of 3×3 pixels adjoining the pixel located at coordinates (2, 2).

FIG. 4B shows an example of a group in which "1" is assigned to those pixels whose luminances exceed a predetermined threshold value.

An initial value "0" is assigned to every pixel beforehand. Then, when the luminance of a pixel exceeds the predetermined threshold value, the first difference processing section 21 and the second difference processing section 26 assign a label "1" to the pixel. A plurality of pixels to which the label "1" is assigned are identified as groups 31 and 32 for the respective groups of adjoining pixels.

FIG. 4C shows an example of groups from which pixels with the initial value "0" are removed.

The first difference processing section 21 and the second difference processing section 26 group the pixels to which the label "1" is assigned (see FIG. 4B), and assign specific labels (e.g., sequential numbers like "1", "2", . . . ) to the groups. In this embodiment, the label "1" is assigned to the group 31, and the label "2" is assigned to the group 32. This can allow groups to be distinguished label by label. Further, the area integrating section 29 sets unillustrated rectangular frames respectively circumscribing the groups 31, 32. Accordingly, each group 31, 32 is identified as an object.

Then, the area integrating section 29 detects if an object is a moving body. An object detected as a moving body by the area integrating section 29 is given information indicating that it is a moving body (hereinafter called "moving body information"), and the object is output to the attribute determining section 12.

The attribute determining section 12 separates the result of detecting a moving body into two areas, namely, a background difference area and a time difference area as will be described later. Then, paying attention to the correlation of "texture" representing the texture and pattern of the top surface of the object in the time difference area, the attribute determining section 12 determines whether or not the object is a light/shadow. In view of that point, the use of both the background difference and the time difference as done in the moving body detecting section 11 according to the embodiment is easily adaptable to the process of the attribute determining section 12.

To surely detect even a slowly moving object as a moving body, the moving body detecting section 11 has only to have the background difference processing section 20. However, with both the background difference processing section 20 and the time difference processing section 25, the moving body detecting section 11 can surely detect a moving body. With regard to other moving body detection methods, the detection can be made by determining information on the time difference in the light/shadow detection.

FIG. 5 shows an example of the internal configuration of the attribute determining section 12.

The attribute determining section 12 has a moving body determining section 36 that, based on an object and moving body information supplied from the moving body detecting section 11, determines whether or not the object is a moving body or is temporarily halting, or determines the size of the object. The attribute determining section 12 also has a texture determining section 37 that determines the texture intensity of an object determined as a moving body within one frame. The attribute determining section 12 further has a similarity determining section 38 that determines the similarity of the same object among a plurality of frames.

A sequence of processes that is executed by the texture determining section 37 and the similarity determining section 38 is hereinafter called "intraframe erroneous light/shadow detection possibility determining process" that determines the possibility of erroneous detection of the light/shadow of an object determined as a moving body within one frame.

The attribute determining section 12 further has an erroneous-light/shadow-detection determining section 39 that determines whether or not an object determined as being temporarily halting, or each of an object determined as a moving body whose similarity has been determined and an object determined as a moving body whose texture has been determined is erroneously detected as light/shadow.

The erroneous-light/shadow-detection determining section 39 determines the possibility of erroneous light/shadow detection based on time-sequentially supplied objects, which is different from the intraframe erroneous light/shadow detection possibility determining process of determining the possibility of erroneous detection of the light/shadow of an object determined as a moving body within one frame.

Next, a description will be given of an example of the process of determining whether or not an object determined as a moving body by the moving body detecting section 11 has been erroneously detected as light/shadow.

First, information on an object and information on a rectangular frame circumscribing the object are input to the moving body determining section 36 from the moving body detecting section 11.

Next, the moving body determining section 36 performs a preprocess on the object detected as a moving body by the moving body detecting section 11. This process is executed according to the time-sequentially input information on the object and the rectangular frame. In the past, an object which is temporarily halting is erroneously detected as light/shadow due to the similarity becoming higher over a plurality of frames at the time of executing similarity determination to be described later. In this respect, the moving body determining section 36 determines whether or not an object is a moving body, so that an object which is a moving body but temporarily halting is not erroneously detected as light/shadow.

For example, when a body moves from outside an image thereinto, the moving body determining section 36 identifies it as an object, and sets, for the object, a flag indicating that the object is a moving body. This flag shows that if the object temporarily halts later, the object is simply temporarily halting and is a moving body.

When there are a certain quantity of pixels in a static area (to be described later) in the rectangular frame circumscribing the object, the moving body determining section 36 determines that the object is temporarily halting. In addition, the moving body determining section 36 may use the state that the center of gravity of the rectangular frame circumscribing an object does not move over a plurality of frames as the condition for determining temporarily halt.

When the above-described area integrating section 29 detects multiple small objects due to irregular reflection or the like, a large quantity of objects appear in one frame. In this case, the processing speed of the moving body determining section 36 is likely to become slower. Accordingly, restriction such that the moving body determining section 36 does not perform light/shadow detection on an object smaller than a predetermined size may be made.

The object which is determined as being temporarily halting by the moving body determining section 36 is input to the erroneous-light/shadow-detection determining section 39. The erroneous-light/shadow-detection determining section 39 accumulatively stores information on the light/shadows of objects which have been erroneously detected as light/shadow in the past frames in a counter or the like at the same pixel position over a plurality of frames. Then, the erroneous-light/shadow-detection determining section 39 determines the object whose accumulated value of erroneous light/shadow detection is equal to or greater than a predetermined value as being erroneously detected as light/shadow. The period in which information on the light/shadow is accumulated in the counter is set to, for example, ⅕ second. The acquisition of the possibility of erroneous detection time-sequentially accumulated over a plurality of frames can allow an object to be finally determined as a moving body, not as light/shadow, even if the object is erroneously detected as light/shadow.

Meanwhile, the erroneous light/shadow detection possibility determining process determines the possibility that each of objects output from the moving body determining section 36 corresponds to erroneous light/shadow detection in one frame. At this time, the texture determining section 37 determines the "texture intensity" which is the degree that indicates whether or not an object has a pattern, based on a variation in the luminance of the object.

An example of similarity of an object originated from the texture difference will be described referring to FIGS. 6A and 6B.

FIG. 6A shows an example of the similarity of a moving body and light for an object with a large texture.

When an object is a moving body and a pattern or the like appears on the top surface thereof, the texture of the object increases. When an object is light, on the other hand, the luminance is distributed uniformly, reducing the texture. At this time, a similarity 41 of the moving body becomes low, while a similarity 42 of the light becomes high.

Accordingly, even with a similarity threshold value $Th_1$ being reduced by the texture determining section 37, it is easy to determine whether the object is a moving body or light/shadow.

FIG. 6B shows an example of the similarity of a moving body and light for an object with a small texture.

Assume that a person with a small texture (e.g., person wearing a black cloth) or the like has appeared in a frame at the location of the background where there is a small texture with less noise in the image. At this time, a similarity 43 of the moving body and a similarity 44 of the light both become high. If the similarities of the moving body and light are determined with the threshold value $Th_1$ as shown in FIG. 6A unchanged, the texture determining section 37 may erroneously detect the object as light/shadow even though the object is a moving body. Apparently, the similarity of an object with a small texture is likely to become higher as compared with the similarity of an object with a large texture.

Accordingly, the texture determining section 37 determines the texture intensity of the object, and the similarity determining section 38 sets a high similarity-determining threshold value for a portion with a low texture intensity and sets a low similarity-determining threshold value for a portion with a high texture intensity. For example, the texture determining section 37 sets a threshold value $Th_2$ higher than the threshold value $Th_1$. This makes it possible to determine an object as a moving body without erroneously detecting the object as a light/shadow-originated change in luminance light/shadow even if the similarity difference of the object is slight.

The texture determining section 37 acquires the texture intensity of the using the following equation 1. The equation 1 is for acquiring the texture intensity by using, for example, energy ENG. In the equation, assuming a pixel i and pixel j in one frame, $L_i$ and $L_j$ are the luminance values of the respective pixels, and $P_\delta(L_i, L_j)$ is a simultaneously normalization matrix which is the probability transformation of the luminance values $L_i$ and $L_j$.

[Eq. 1]

$$ENG = \sum_{L_i=0}^{L-1} \sum_{L_j=0}^{L-1} \{P_\delta(L_i, L_j)\}^2 \qquad (1)$$

The texture determining section 37 can acquire the texture intensity by checking a variation in the luminance difference of an object in one frame in the above manner. The energy ENG has such a property as to show a high value when the texture intensity is low, and to show a high value when the texture intensity is high. Therefore, the texture determining section 37 can determine that the texture intensity is low when the energy ENG exceeds a predetermined threshold value, and that the texture intensity is high when the energy ENG is equal to or smaller than the predetermined threshold value.

Next, the similarity determining section 38 acquires the "texture similarity" which is the degree that indicates whether or not the patterns of objects of interest over a plurality of frames are similar, and determines an object with a high similarity as being detected as light/shadow. In the similarity determination which is executed by the similarity determining section 38, the present and past similarities of an object at a predetermined position are computed (see FIGS. 9A and 9B to be discussed later). This computation is carried out paying attention to the property that the texture similarity of a past image at the position of the object becomes high when the detection is resulted from a light/shadow-originated change in luminance, and the texture similarity becomes low when the object is a moving body.

A general similarity is acquired by using normalization correlation given by the following equation 2.

[Eq. 2]

$$\frac{\sum\sum (I_t - \overline{I_t})(I_{t-N} - \overline{I_{t-N}})}{\sqrt{\sum\sum (I_t - \overline{I_t})^2 \times \sum\sum (I_{t-N} - \overline{I_{t-N}})^2}} \qquad (2)$$

where
$I_t$: luminance value of each pixel of the moving body in the image,
$\overline{I_t}$: average of luminance values of individual pixels of the moving body in the image,
$I_{t-N}$: luminance value of each pixel in the past image, and
$\overline{I_{t-N}}$: average of luminance values of individual pixels in the past image.

FIGS. 7A and 7B show examples of the texture similarity between a present image and a past image.

FIG. 7A shows an example of the texture similarity when an object is a person (moving body).

In this example, let an image in the present frame be a present image 51a, and let an image which is older by N frames than the present image be a past image 51b. An object 53 representing a person is shown in each of the present image 51a and the past image 51b. However, the past image 51b has only a part of the object 53 contained in a rectangular frame 52 in which the position of the object is determined, while the present image 51a has the entire object 53 contained in the rectangular frame 52.

At this time, the comparison of the objects 53 in the present image 51a and the past image 51b with each other between frames clearly shows that the textures are not similar in the rectangular frame 52. Accordingly, the similarity determining section 38 can detect that the object 53 is a moving body.

FIG. 7B shows an example of the texture similarity when an object is a static body.

In this example, let an image in the present frame be a present image 54a, and let an image which is older by N frames than the present image be a past image 54b. An object 56 representing a tree is shown in each of the present image 54a and the past image 54b. Further, an object 57 representing the shadow of a tree is shown in the object 56. Furthermore, the present image 54a and the past image 54b both have the objects 56, 57 contained in a rectangular frame 55 in which the positions of the objects are determined.

At this time, the comparison of the objects 56 in the present image 54a and the past image 54b with each other between frames shows that the object 56 in the rectangular frame 55 is a static body, so that the textures of both objects 56 are similar to each other. Accordingly, the similarity determining section 38 can detect that the object 56, 57 is a temporarily halting body.

It is likely that mere execution of simple computation of the texture similarity of an object makes the similarity between frames higher for a person who moves frontward from a deeper side or a person who moves deeper from the front side along the imaging direction of a camera (direction of the optical axis of the lens) because the movement lacks the lateral motion.

Because such a movement shows a slight change in the texture similarity, it may cause erroneous light/shadow detection or erroneous recognition of an object as a static body (or background). To prevent a person who moves frontward from a deeper side from being erroneously detected as light/shadow, therefore, the area of an object is further separated into a static area and a dynamic area, and attention is paid to the similarity of the dynamic area. At this time, the similarity determining section 38 separates an object into a static area which is commonly contained in a plurality of frames and a dynamic area which differs among a plurality of frames, and determines that the object is a light/shadow-originated change in luminance when the similarity of the static area is higher than a predetermined threshold value.

FIGS. 8A and 8B show a case where a person moves frontward from a deeper side of the screen.

FIG. 8A shows a first example of the case where a person moves frontward from a deeper side of the screen.

In this example, a same frame 61 shows a past image and a present image overlapping one on the other. The frame 61 includes a rectangular frame 62 where the position of the object is determined, an object 63 positioned deep in the screen, and an object 64 positioned on the front side of the screen. In the example, the objects 63 and 64 represent persons.

Hereinafter, an area which shows a small change in luminance from the past luminance is called "static area", and an area which shows a large change in luminance from the past luminance is called "dynamic area".

As a person moves frontward from a deeper side of the screen, the object 63 is enlarged to the size of the object 64. In this example, the area of the object 63 is a "static area" where the luminance does not change with the time. As the object 63 moves frontward from a deeper side of the screen, the area of the object 63 is enlarged to the object 64 with a change in luminance, so that the area of the object 64 excluding the object 63 is a "dynamic area" where a change in luminance is large.

FIG. 8B shows a second example of the case where a person moves frontward from a deeper side of the screen.

In this example, a same frame 65 likewise shows a past image and a present image overlapping one on the other. The frame 65 includes a rectangular frame 66 where the position of the object is determined, an object 67 positioned deep in the screen, and an object 68 positioned on the front side of the screen.

As a person moves frontward from a deeper side of the screen, the object 67 is enlarged to the size of the object 68. The area of the object 67 is a "static area" where a change in luminance is small, and the area of the object 68 excluding the object 67 is a "dynamic area" where a change in luminance is large.

The dynamic area has a property such that the texture similarity to a past one becomes higher in case of light/shadow detection, and becomes lower in case of a moving body such as a person. The similarity determining section 38 presets a threshold value $Th_3$. Finally, the similarity determining section 38 uses the sum of a similarity ($Corr_{All}$) of the whole object and a similarity ($Corr_{move}$) of a dynamic area as a value (Corr) of determining the light/shadow of the object. The determining value (Corr) is acquired by the following equation 3.

[Eq. 3]

$$Corr = Corr_{All} + Corr_{move} \quad (3)$$

If the determining value (Corr) is high, it is determined that the object in the present frame is very likely to have been erroneously detected as light/shadow.

FIGS. 9A and 9B show comparative examples of the normal similarity and the similarity of a static area.

FIG. 9A shows an example of the normal similarity.

In case where an object is a moving body, when the object transverses the screen, a similarity 71 of the objects contained in past and present images is low. When the object moves frontward from a deeper side of the screen, on the other hand, a similarity 72 of the objects contained in past and present images becomes high. The similarity 72 of the object is substantially the same value as the similarity 73 of the object identified as light, and the similarity 72, 73 is higher than the threshold value $Th_3$. Therefore, the object may be erroneously detected as temporarily halting.

FIG. 9B shows an example of the similarity of a static area shown in FIGS. 8A and 8B.

In case where an object is a moving body, when the object transverses the screen, a similarity 74 of the static area of the object is low. When the object moves frontward from a deeper side of the screen, on the other hand, a similarity 75 of the static areas of the objects contained in past and present images are low. In case where an object is light, on the other hand, a similarity 76 of the objects contained in past and present images become high. As a result, the similarity 75 of the object is lower than the threshold value $Th_3$, thus making it possible to detect an object moving frontward from the deeper side of the screen as a moving body.

As apparent from the above, the erroneous-light/shadow-detection determining section 39 time-sequentially acquires data for determining erroneous light/shadow detection to thereby finally determines whether or not an object has been erroneously detected as light/shadow. To achieve this, the possibilities of erroneous light/shadow detection in individual frames are summed up, and the summed possibility of erroneous light/shadow detection up to the present frame is compared with the possibility of no erroneous light/shadow detection. Then, attribute information indicating light/shadow detection is added to an object which is very likely to be erroneously detected as light/shadow.

Figure 10A:
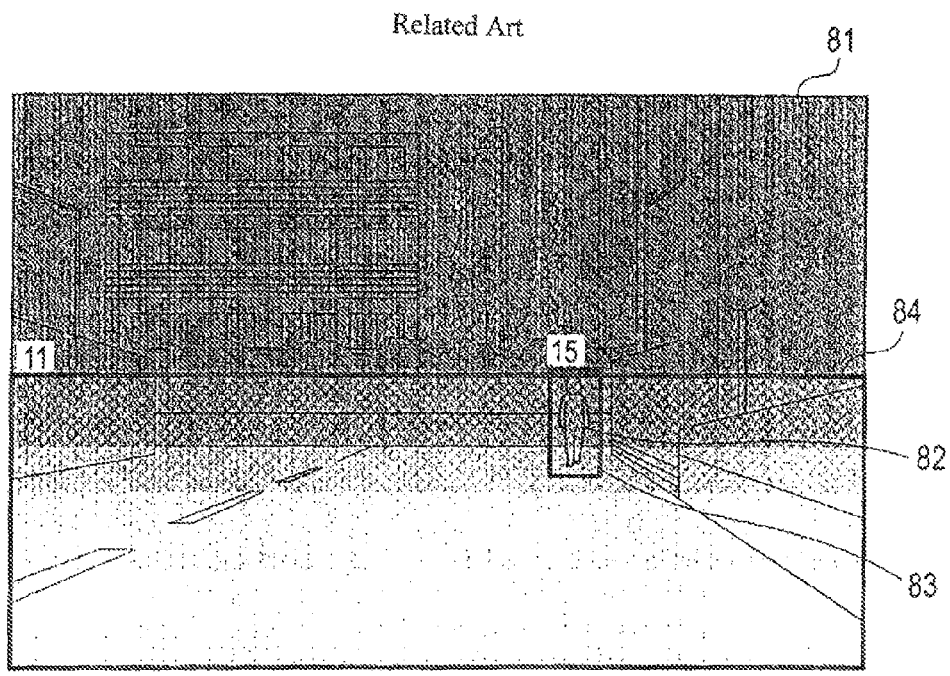
FIGS. 10A and 10B are explanatory diagrams showing examples of moving body detecting images before and after application of a moving body detecting process according to the embodiment of the invention.
Figure 10B:
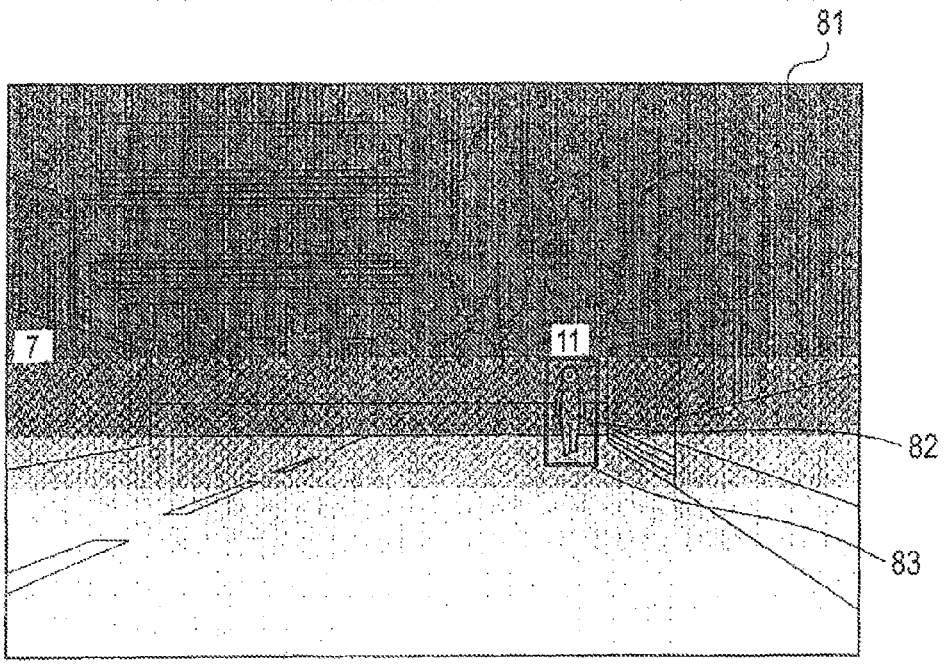

Now, referring to FIGS. 10A and 10B, the result of the detection using the moving body detecting process according to the related art is compared with the result of the detection using the moving body detecting process according to the embodiment of the invention.

FIG. 10A shows an example of the result of the detection using the moving body detecting process according to the related art.

An image 81 acquired by imaging a street at night is dark at the upper half of the screen, and is bright at the lower half. The moving body detecting process according to the related art forms a rectangular frame 83 around a person who moves frontward from a deeper side of the screen, and identifies the person as an object 82. Further, because a bright area is formed in the lower half of the screen by illumination of a headlight or the like, an object 84 is identified as a moving body. Therefore, the accuracy of detecting a moving body is low.

FIG. 10B shows an example of the result of the detection using the moving body detecting process according to the embodiment of the invention.

The moving body detecting process in this example detects only an object 82 as a moving body. The lower half of the screen is detected as light/shadow, and attribute information is added to this object, so that the object can be identified as a background image. This enhances the accuracy of detecting a moving body.

The imaging apparatus 1 according to the embodiment of the invention can automatically determine whether or not an object detected as a moving body by the monitoring imaging apparatus is erroneously detected as light/shadow. Accordingly, even a person who comes frontward from a deeper side of the screen or a person temporarily halting can surely be detected as a moving body. This brings about an advantage of improving the accuracy of detecting a moving body, and enhancing the security performance, for example, when the imaging apparatus is adopted to the security application.

In case of performing light/shadow detection on an object, the texture intensity of the object is acquired based on a variation in the luminance of the object, and the similarity threshold value is changed according to the degree of the texture intensity. Therefore, determination of the similarity prevents an object without a pattern from being erroneously detected as light/shadow even if the object has a large texture intensity between frames or the object has a small texture. This brings about an advantage of improving the accuracy of detecting an object as a moving body.

Further, separation of an object into a static area and a dynamic area makes it possible to determine whether or not even an object which moves frontward from a deeper side of a frame is a change in luminance. This brings about an advantage such that even an object which is identified as temporarily halting or as a static body according to the related art can be detected as a moving body.

In addition, information on whether light/shadow detection is made or not is converted into meta data which is output to an external apparatus. Accordingly, an external apparatus which receives the meta data from the imaging apparatus 1 is easier to extract only an object detected as a moving body from a plurality of objects, thus facilitating the operation according to the application.

2. Modifications

Although the moving body detecting section 11 in the above-described imaging apparatus 1 according to the embodiment has the background difference processing section 20 and the time difference processing section 25, the moving body detecting section 11 may be configured to have only the background difference processing section 20. In this case, the presence/absence of a moving body can be detected by executing a process similar to the process of the time difference processing section 25 in the erroneous light/shadow detection possibility determining process.

Further, the system or apparatus may be provided with a recording medium recording program codes of software which achieves the functions of the foregoing embodiment. Furthermore, it is needless to say that the functions are achieved as the computer (or control unit, such as a CPU) of the system or apparatus reads and executes program codes stored in such a recording medium.

A floppy disk, a hard disk, an optical disc, a magneto-optical disc, a CD-ROM, a CD-R, a magnetic tape, a non-volatile memory card, a ROM or the like can be used as a recording medium to supply the program codes.

Moreover, the functions of the foregoing embodiment are achieved by executing the program codes read by the computer. In addition, the OS or the like which is running on the computer executes a part or all of the actual processes. A case where the functions of the foregoing embodiment are achieved by such processing is also encompassed in the scope of the invention.

The invention is not limited to the above-described embodiment, but may take various other configurations without departing from the scope of the invention.

The present application contains subject matter related to that disclosed in Japanese Priority Patent Application JP 2009-058357 filed in the Japan Patent Office on Mar. 11, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a moving body detecting section that detects if an object in an image is a moving body which makes a motion between frames; and
an attribute determining section that (1) performs light/shadow detection on the object by determining (a) a similarity indicating whether or not the object, detected as the moving body by the moving body detecting section, is similar among a plurality of frames, and (b) a change in luminance of the object based on a texture and luminance of the object, and, (2) when determining that the object detected as moving is instead detected due to a light/shadow-originated change in luminance rather than due to moving, adds attribute information indicating the light/shadow-originated change in luminance to the object detected as the moving body.

2. The imaging apparatus according to claim 1, wherein the attribute dote determining section includes:
a moving body determining section that determines whether the object is temporarily halting or is a moving body;
a texture determining section that determines a texture intensity of the object determined as the moving body in a predetermined frame;
a similarity determining section that determines a similarity of the object among the plurality of frames based on the texture determined by the texture determining section; and
an erroneous-light/shadow-detection determining section that determines whether or not the object determined as being temporarily halting by the moving body determining section or the object whose similarity has been determined by the similarity determining section is erroneously detected as a light/shadow.

3. The imaging apparatus according to claim 2, wherein the texture determining section determines the texture intensity of the object based on a variation in change in luminance of the object, and
the similarity determining section determines the similarity of the object by setting a similarity-determining threshold value high for a portion whose texture intensity is low and setting the similarity-determining threshold value low for a portion whose texture intensity is high.

4. The imaging apparatus according to claim 2, wherein the similarity determining section separates the object into a static area commonly included in the plurality of frames and a dynamic area which differs among the plurality of frames, and determines that the object is a light/shadow-originated change in luminance when a similarity of the static area is higher than a predetermined threshold value.

5. The imaging apparatus according to claim 4, further comprising:
a meta data generating section that generates meta data containing the attribute information indicating that the object is a light/shadow-originated change in luminance, and basic information of the image based on the object to which the attribute information is added; and
a transfer section that transfers the meta data generated by the meta data generating section.

6. A moving body detecting method comprising the steps of:
detecting if an object in an image, output by an imaging section, is a moving body which makes a motion between frames; and
performing light/shadow detection on the object by determining (a) a similarity indicating whether or not the object, detected as the moving body, is similar among a plurality of frames, and (b) a change in luminance of the object based on a texture and luminance of the object; and,
when determining that the object detected as moving is instead detected due to a light/shadow-originated change in luminance rather than due to moving, adding attribute information indicating the light/shadow-originated change in luminance to the object detected as the moving body.

7. A moving body detecting circuit comprising:
a moving body detecting section that detects if an object in an image is a moving body which makes a motion between frames; and
an attribute determining section that, (1) performs light/shadow detection on the object by determining (a) a similarity indicating whether or not the object detected as the moving body, by the moving body detecting section, is similar among a plurality of frames, and (b) a change in luminance of the object based on a texture and luminance of the object, and, (2) when determining that the object detected as moving is instead detected due to a light/shadow-originated change in luminance rather than due to moving, adds attribute information indicating the light/shadow-originated change in luminance to the object detected as the moving body.

8. A program embodied on a non-transitory computer readable medium for allowing a computer to execute:

a step of detecting if an object in an image is a moving body which makes a motion between frames; and a step of performing light/shadow detection on the object by determining (a) a similarity indicating whether or not the object, detected as the moving body, is similar among a plurality of frames, and (b) a change in luminance of the object based on a texture and luminance of the object; and when determining that the object detected as moving is instead detected due to a light/shadow originated-change in luminance rather than due to moving, adding attribute information indicating the light/shadow-originated change in luminance to the object detected as the moving body.

9. The imaging apparatus according to claim 3, wherein the similarity determining section separates the object into a static area commonly included in the plurality of frames and a dynamic area which differs among the plurality of frames, and determines that the object is a light/shadow-originated change in luminance when a similarity of the static area is higher than a predetermined threshold value.

10. The imaging apparatus according to claim 9, further comprising:

a meta data generating section that generates meta data containing the attribute information indicating that the object is a light/shadow-originated change in luminance, and basic information of the image based on the object to which the attribute information is added; and a transfer section that transfers the meta data generated by the meta data generating section.

* * * * *